N. BLATCHLY.
Plow.
No. 9,129. Patented July 20, 1852.
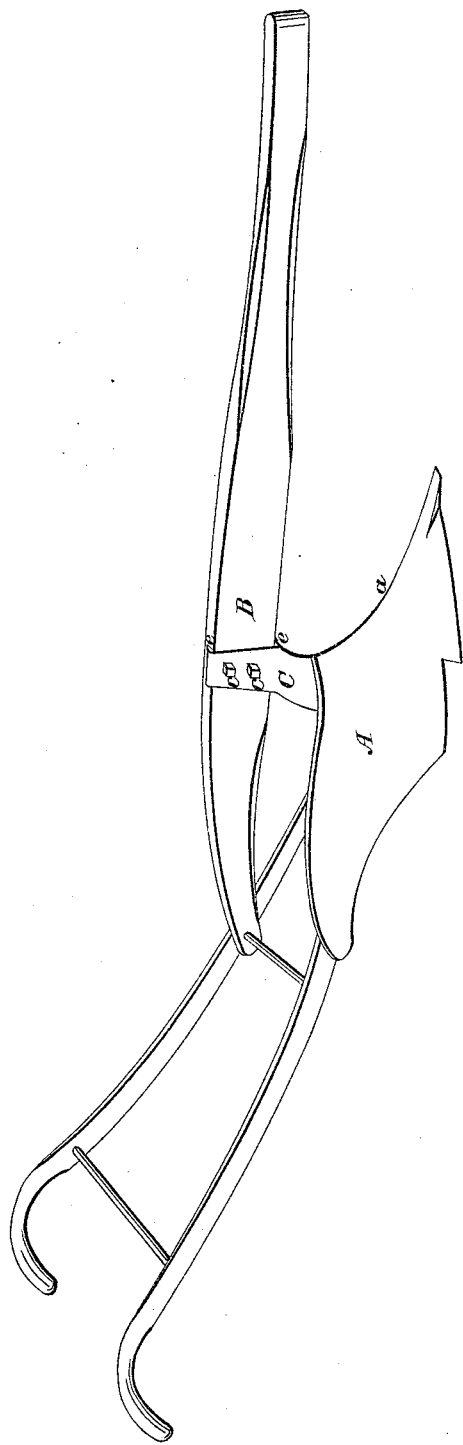

UNITED STATES PATENT OFFICE.

N. BLATCHLY, OF WINDSOR, NEW YORK.

IMPROVEMENT IN PLOWS.

Specification forming part of Letters Patent No. 9,129, dated July 20, 1852.

*To all whom it may concern:*

Be it known that I, NERI BLATCHLY, of Windsor, in the county of Broome and State of New York, have invented a new and useful Improvement in Plows, of which the following is a full, clear, and exact description, reference being had to the accompanying drawing, which forms part of this specification, and which represents a view in perspective of one of my plows.

Plows as ordinarily constructed have the defect of tending to throw a portion of the clods, stones, weeds, and rubbish they meet in their progress to the land side, where they will meet and obstruct the plow when it passes along to turn the next furrow. This defect, although very appreciable in shallow plowing, becomes very serious in deep plowing, where the plow is buried almost to the beam, in which case a comparatively small amount of rubbish lodged under the beam will raise the plow and prevent it from penetrating to its proper depth.

The object of my invention is to obviate this defect; and it consists in arranging the beam on the land side of the shim of the plow and in connecting it with the plow-irons by a standard which is bent or kinked toward the land side, so as to throw the obstructions to the furrow side of the plow.

In the plow represented in the accompanying drawing, A is the mold-board, which may be of any approved form and construction, and which is fitted to a landside and the other customary plow-irons. The beam B is connected with the irons by means of a standard, C, which is bent so far over the landside of the plow that the inner side of the beam is outside of the shim *a* of the plow. The upper portion of this standard in this example is let into the inner face of the beam, and is secured thereto by bolts *c c*, while the beam is prevented from rising or falling by means of two lugs, *e e*, which are cast fast to the standard and extend the one above and the other beneath the beam.

An inspection of the accompanying drawing will be sufficient to demonstrate that the furrow-slice rising up the mold board cannot strike the beam, for the latter is sufficiently over the landside of the plow to be out of the way of the slice and any clods, roots, stubble, or weeds lying thereon, however high the same may rise. Hence this method of constructing the standard and arranging the beam is superior to the ordinary plans, for the slice of earth is turned over more neatly and effectually and with less resistance than when it has to rub against accumulations of rubbish lodged under the beam.

Clods and other obstructions are always found in greater or less quantity on the ground. Those which rise upon the shim of the plow and naturally tend to fall to the furrow side will not under this arrangement be deflected from their course by contact with the beam, and those clods which are evenly balanced upon the shim will have this balance destroyed when they rise to the bend of the standard, and consequently will be thrown to the furrow side, thus leaving the adjacent land unencumbered and free for the subsequent action of the plow in turning another furrow.

The form of standard I have represented in the accompanying drawing is sufficient to elucidate the principle of my invention; but I do not confine myself to either the particular curvature there shown or the method of securing it to the beam, as these may be varied according to circumstances or to suit the peculiar views of different constructors. Thus, for example, the curve of the bent portion of the standard may have its concave side upward instead of its convex, as shown in the drawing, or the upper extremity of the standard may be bent or formed so as to be passed horizontally, diagonally, or vertically through a mortise in the beam instead of being let into its side, the inner corner of the beam being in this case rounded or chamfered off.

What I claim as my invention, and desire to secure by Letters Patent, is—

The arrangement of the beam of a plow with respect to the irons and the bending of the standard toward the land, and having its line of direction parallel with that of the landside, in the manner and for the purposes herein set forth.

In testimony whereof I have hereunto subscribed my name.

N. BLATCHLY.

Witnesses:
ADDISON McKEE,
NATHAN B. BECKWITH.